United States Patent
Miyazaki et al.

(10) Patent No.: US 8,593,974 B2
(45) Date of Patent: Nov. 26, 2013

(54) COMMUNICATION CONDITIONS DETERMINATION METHOD, COMMUNICATION CONDITIONS DETERMINATION SYSTEM, AND DETERMINATION APPARATUS

(75) Inventors: Hideaki Miyazaki, Kawasaki (JP); Masanobu Morinaga, Kawasaki (JP); Noriyuki Fukuyama, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 832 days.

(21) Appl. No.: 11/442,980

(22) Filed: May 31, 2006

(65) Prior Publication Data

US 2007/0177598 A1 Aug. 2, 2007

(30) Foreign Application Priority Data

Jan. 30, 2006 (JP) ................. 2006-021477

(51) Int. Cl.
 *G01R 31/08* (2006.01)
(52) U.S. Cl.
 USPC .......................................... 370/242; 370/248
(58) Field of Classification Search
 None
 See application file for complete search history.

(56) References Cited

U.S. PATENT DOCUMENTS

| | | | | |
|---|---|---|---|---|
| 5,276,440 A * | 1/1994 | Jolissaint et al. | ................ | 714/25 |
| 5,617,421 A * | 4/1997 | Chin et al. | ................ | 370/402 |
| 5,995,485 A * | 11/1999 | Croslin | ................ | 370/216 |
| 6,031,819 A * | 2/2000 | Croslin | ................ | 370/217 |
| 6,075,766 A * | 6/2000 | Croslin | ................ | 370/225 |
| 6,219,335 B1 * | 4/2001 | Luk et al. | ................ | 370/222 |
| 6,226,261 B1 * | 5/2001 | Hurtta et al. | ................ | 370/219 |
| 6,253,339 B1 * | 6/2001 | Tse et al. | ................ | 714/47.1 |
| 6,370,571 B1 * | 4/2002 | Medin, Jr. | ................ | 709/218 |
| 6,466,548 B1 * | 10/2002 | Fitzgerald | ................ | 370/249 |
| 6,519,636 B2 * | 2/2003 | Engel et al. | ................ | 709/223 |
| 6,747,957 B1 * | 6/2004 | Pithawala et al. | ................ | 370/252 |
| 6,757,742 B1 * | 6/2004 | Viswanath | ................ | 709/246 |
| 6,765,909 B1 * | 7/2004 | Sen et al. | ................ | 370/392 |
| 6,804,532 B1 * | 10/2004 | Moon et al. | ................ | 455/552.1 |
| 6,981,039 B2 * | 12/2005 | Cerami et al. | ................ | 709/223 |
| 7,075,887 B2 * | 7/2006 | Love et al. | ................ | 370/218 |
| 7,225,275 B2 * | 5/2007 | Medin | ................ | 709/249 |
| 7,257,744 B2 * | 8/2007 | Sabet et al. | ................ | 714/56 |

(Continued)

FOREIGN PATENT DOCUMENTS

| | | |
|---|---|---|
| JP | 2001-127795 | 5/2001 |
| JP | 2002-077160 | 3/2002 |

(Continued)

*Primary Examiner* — Faruk Hamza
*Assistant Examiner* — Andrew Oh
(74) *Attorney, Agent, or Firm* — Staas & Halsey LLP

(57) ABSTRACT

A communication conditions determination method, a communication conditions determination system, and a determination apparatus are provided in which the conditions of communication which is performed through a plurality of communication networks are determined without setting up a special apparatus on all the communication networks and without increasing the existing traffic. In a first communication network 100 and a second communication network 200 which are connected by a first connection apparatus 1 such as a router, a determination is made as to whether the source of a packet passed through the second communication network 200 is the first connection apparatus 1 or an apparatus other than the first connection apparatus 1. Packets whose respective sources are the first connection apparatus 1 and packets whose respective sources are an apparatus other than the first connection apparatus 1 are individually summarized. By comparing summarized results, the communication conditions are determined.

21 Claims, 10 Drawing Sheets

(56) References Cited

U.S. PATENT DOCUMENTS

| | | | |
|---|---|---|---|
| 7,268,690 B2* | 9/2007 | Nguyen et al. | 340/588 |
| 7,440,409 B2* | 10/2008 | Nagao | 370/252 |
| 7,447,147 B2* | 11/2008 | Nguyen et al. | 370/216 |
| 7,450,507 B2* | 11/2008 | Tundlam et al. | 370/232 |
| 7,515,542 B2* | 4/2009 | Hertoghs et al. | 370/236.2 |
| 7,551,568 B2* | 6/2009 | Jeong et al. | 370/252 |
| 7,583,593 B2* | 9/2009 | Guichard et al. | 370/225 |
| 7,855,968 B2* | 12/2010 | Elie-Dit-Cosaque et al. | 370/241.1 |
| 7,889,647 B2* | 2/2011 | Kawashima et al. | 370/230 |
| 2001/0046230 A1* | 11/2001 | Rojas | 370/389 |
| 2001/0048660 A1* | 12/2001 | Saleh et al. | 370/216 |
| 2002/0015387 A1* | 2/2002 | Houh | 370/250 |
| 2002/0097674 A1* | 7/2002 | Balabhadrapatruni et al. | 370/229 |
| 2002/0186661 A1* | 12/2002 | Santiago et al. | 370/252 |
| 2003/0043853 A1* | 3/2003 | Doyle et al. | 370/489 |
| 2003/0067881 A1* | 4/2003 | Lunt et al. | 370/242 |
| 2003/0086422 A1* | 5/2003 | Klinker et al. | 370/389 |
| 2003/0231598 A1* | 12/2003 | Venkataraman et al. | 370/252 |
| 2004/0199627 A1* | 10/2004 | Frietsch | 709/224 |
| 2005/0094567 A1* | 5/2005 | Kannan et al. | 370/241 |
| 2005/0099951 A1* | 5/2005 | Mohan et al. | 370/241 |
| 2005/0099952 A1* | 5/2005 | Mohan et al. | 370/241 |
| 2005/0099954 A1* | 5/2005 | Mohan et al. | 370/241.1 |
| 2005/0100017 A1* | 5/2005 | Williams et al. | 370/394 |
| 2005/0174949 A1* | 8/2005 | Renken et al. | 370/248 |
| 2005/0185587 A1* | 8/2005 | Klinker | 370/237 |
| 2005/0204028 A1* | 9/2005 | Bahl et al. | 709/223 |
| 2005/0243733 A1* | 11/2005 | Crawford et al. | 370/252 |
| 2005/0276230 A1* | 12/2005 | Akahane et al. | 370/252 |
| 2006/0002386 A1* | 1/2006 | Yik et al. | 370/389 |
| 2006/0013210 A1* | 1/2006 | Bordogna et al. | 370/389 |
| 2006/0067239 A1* | 3/2006 | Olinski | 370/242 |
| 2006/0072474 A1* | 4/2006 | Mitchell | 370/252 |
| 2006/0083180 A1* | 4/2006 | Baba et al. | 370/252 |
| 2006/0085538 A1* | 4/2006 | Newman et al. | 709/224 |
| 2006/0126495 A1* | 6/2006 | Guichard et al. | 370/216 |
| 2006/0126511 A1* | 6/2006 | Youn et al. | 370/235 |
| 2006/0176824 A1* | 8/2006 | Laver et al. | 370/241 |
| 2006/0182034 A1* | 8/2006 | Klinker et al. | 370/238 |
| 2006/0215577 A1* | 9/2006 | Guichard et al. | 370/254 |
| 2006/0215579 A1* | 9/2006 | Nadeau et al. | 370/254 |
| 2006/0227716 A1* | 10/2006 | Chandrasekaran et al. | 370/252 |
| 2006/0227717 A1* | 10/2006 | van den Berg et al. | 370/252 |
| 2006/0233130 A1* | 10/2006 | Rajkotia | 370/328 |
| 2007/0008894 A1* | 1/2007 | Lynch et al. | 370/244 |
| 2007/0086457 A1* | 4/2007 | Rune et al. | 370/390 |
| 2007/0115847 A1* | 5/2007 | Strutt et al. | 370/252 |

FOREIGN PATENT DOCUMENTS

| | | |
|---|---|---|
| JP | 2003-318985 | 11/2003 |
| JP | 2004-032377 | 1/2004 |
| JP | 2004-104540 | 4/2004 |
| JP | 2006-013969 | 1/2006 |

* cited by examiner

F I G. 2
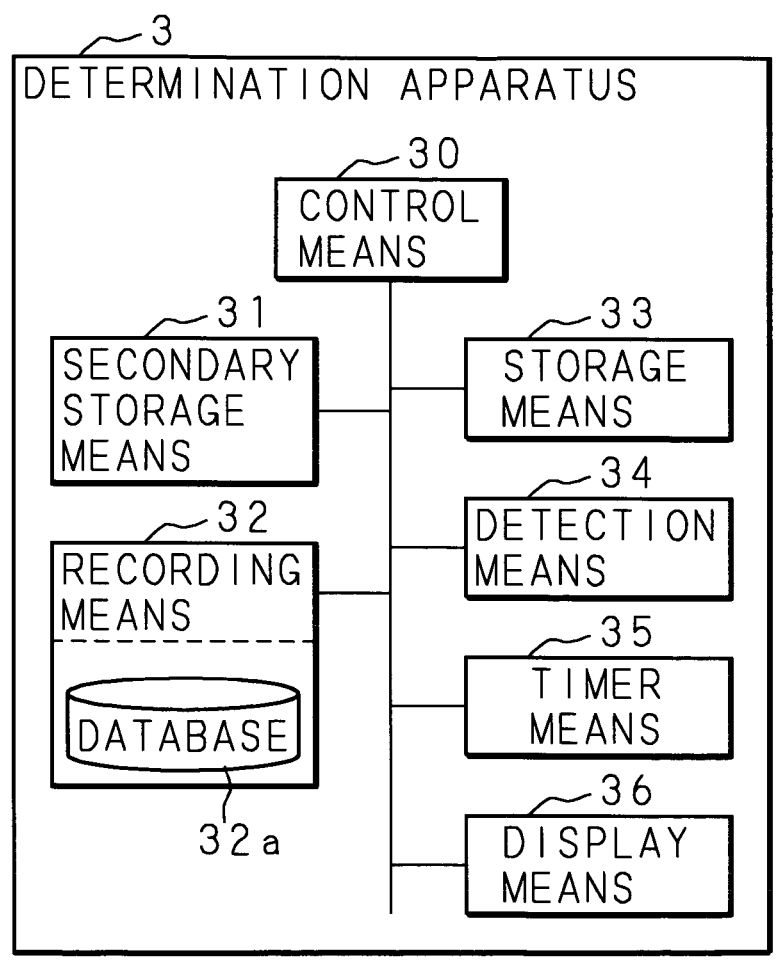

F I G. 6

| CUSTOMER ID | FIRST CONNECTION APPARATUS IP ADDRESS | COMMUNICATION APPARATUS IP ADDRESS |
|---|---|---|
| CU0001 | 10.10.10.2 | 192.168.2.0/24 |
| CU0002 | 10.10.10.3 | 192.168.3.0/24 |
| CU0003 | 10.10.10.4 | 192.168.4.0/24 |
| ⋮ | ⋮ | ⋮ |

FIG. 9

| SOURCE APPARATUS | | LOSS RATE | | INCREMENT OF DELAY TIME | | |
|---|---|---|---|---|---|---|
| CUSTOMER ID | APPARATUS | AVERAGE VALUE | NUMBER OF SAMPLES | AVERAGE VALUE | STANDARD DEVIATION | NUMBER OF SAMPLES |
| CU0001 | FIRST CONNECTION APPARATUS 1 | 0 | 100 | 1.5 | 0.2 | 100 |
| | TERMINAL IN FIRST COMMUNICATION NETWORK 100 | 0 | 300 | 2.0 | 0.2 | 280 |
| CU0002 | FIRST CONNECTION APPARATUS 1 | 0 | 105 | 1.0 | 0.1 | 105 |
| | TERMINAL IN FIRST COMMUNICATION NETWORK 100 | 0 | 280 | 2.0 | 0.2 | 250 |
| CU0003 | FIRST CONNECTION APPARATUS 1 | 0 | 95 | 3.0 | 1.0 | 95 |
| | TERMINAL IN FIRST COMMUNICATION NETWORK 100 | 0 | 200 | 80 | 15 | 190 |
| ... | ... | ... | ... | ... | ... | ... |

FIG. 10

| CUSTOMER ID | LOSS FAILURE | | | DELAY FAILURE | | |
|---|---|---|---|---|---|---|
| | PRESENCE/ ABSENCE | FAILURE POINT | FAILURE CORRELATION VALUE | PRESENCE/ ABSENCE | FAILURE POINT | FAILURE CORRELATION VALUE |
| CU0001 | ABSENT | — | — | ABSENT | — | — |
| CU0002 | PRESENT | CARRIER NETWORK | t=0.5 (CORRELATION) | ABSENT | — | — |
| CU0003 | ABSENT | — | — | PRESENT | CUSTOMER NETWORK | t=30 (NO CORRELATION) |
| … | … | … | … | … | … | … |

COMMUNICATION CONDITIONS DETERMINATION METHOD, COMMUNICATION CONDITIONS DETERMINATION SYSTEM, AND DETERMINATION APPARATUS

CROSS-REFERENCE OF RELATED APPLICATION

This Nonprovisional Application claims priority under 35 U.S.C. §119(a) on Patent Application No. 2006-021477 in Japan on Jan. 30, 2006, the entire contents of which are hereby incorporated by reference.

BACKGROUND OF THE INVENTION

1. Field of the Invention

The present invention relates to a communication conditions determination method of determining the communication conditions of a first communication network and a second communication network which are connected by a connection apparatus such as a router, a communication conditions determination system that employs the communication conditions determination method, and a determination apparatus used in the communication conditions determination system. In particular, the present invention relates to a communication conditions determination method, a communication conditions determination system, and a determination apparatus, in which a communication network whose communication conditions are poor is identified.

2. Description of the Related Art

One of the tasks performed by an entity, such as an ISP (Internet Service Provider), that provides services allowing users to use the Internet includes, upon occurrence of a communication failure such as a packet loss or a delay caused by a congestion on a communication network, an identification of the failure point and a support for the failure. Services provided by an entity such as an ISP use a plurality of communication networks including a customer network, a carrier network, and an ISP network whose administrators are different from one another. When a communication failure occurs, it is necessary to identify, among the customer, carrier, and ISP networks, a communication network on which the communication failure is occurring.

Japanese Patent Application Laid-Open No. 2002-077160 discloses a method in which a measurement apparatus that extracts packet data is disposed at a plurality of points on a communication network, packet data obtained when a single packet passes through each of the points is extracted, and the timestamps of the extracted packet data are compared, whereby communication quality such as a delay time between the extraction points is evaluated. There exists a method of identifying a failure point based on evaluation results.

In addition, Japanese Patent Application Laid-Open No. 2004-104540 discloses a method in which a measurement IP (Internet Protocol) packet is sent to an apparatus on a communication network from a monitoring apparatus and a failure point is identified based on a response time to the sent IP packet.

However, when the method described in Japanese Patent Application Laid-Open No. 2002-077160 is used to identify a communication network on which a communication failure has occurred, a measurement apparatus that extracts packet data needs to be disposed at locations where the communication networks are connected. Since the disposition of the measurement apparatus on a communication network administered by other entities causes various problems, implementation is less feasible.

On the other hand, in the method described in Japanese Patent Application Laid-Open No. 2004-104540, in order to increase the accuracy of measurement, large numbers of IP packets need to be sent. As a result, the traffic is increased, which may adversely affect other communication.

BRIEF SUMMARY OF THE INVENTION

The present invention is made in view of the foregoing and other problems. When a first communication network such as a customer network, a second communication network such as a carrier network, and a third communication network such as an ISP network are provided and the first communication network and the second communication network are connected by a connection apparatus such as a router, a packet passed through the second communication network and entering the third communication network is detected and a determination is made as to whether the detected packet is a packet sent to the second communication network from the connection apparatus. If the packet is determined to be a packet sent to the second communication network from the connection apparatus, a determination is made as to whether the source apparatus of the packet is the connection apparatus or an apparatus other than the connection apparatus. Packets whose respective source apparatuses are determined to be the connection apparatus and packets whose respective source apparatuses are determined to be an apparatus other than the connection apparatus are individually summarized. By comparing individual summarized results, the communication conditions of the first communication network and the second communication network are determined. An object of the present invention is to provide a communication conditions determination method in which by the aforementioned configuration an entity that administers the third communication network does not need to set up a special apparatus on the first communication network and the second communication network which are administered by other entities, and an increase in traffic does not occur because probing packets are not used, a communication conditions determination system that employs the communication conditions determination method, and a determination apparatus used in the communication conditions determination system.

According to a first aspect of the present invention, there is provided a communication conditions determination method of determining communication conditions of a first communication network and a second communication network which are connected by a connection apparatus, the method comprising the steps of determining whether a packet passed through the second communication network is a packet sent from the connection apparatus to the second communication network, determining, if the packet is determined to be a packet sent from the connection apparatus to the second communication network, whether a source apparatus of the packet is the connection apparatus or an apparatus other than the connection apparatus, individually summarizing packets whose respective source apparatuses are determined to be the connection apparatus and packets whose respective source apparatuses are determined to be an apparatus other than the connection apparatus, and comparing individual summarized results and determining the communication conditions of the first communication network and the second communication network.

In the present invention, by determining whether a packet detected by the determination apparatus is a packet sent to the second communication network from the connection apparatus, only those packets that are sent through the connection apparatus to the second communication network from the first communication network and those packets that are sent to the second communication network from the connection apparatus can be used for summarization. In addition, in the present invention, by determining whether the source apparatus of the packet detected by the determination apparatus is the connection apparatus, packets passed through both the first communication network and the second communication network and packets passed through only the second communication network can be determined and those packets can be summarized separately for each group of packets. Then, in the present invention, by comparing the individual summarized results of the packets passed through both the first communication network and the second communication network and the packets passed through only the second communication network, a determination can be made as to which one of the first communication network and the second communication network is causing a communication failure. In this manner, in the present invention, without setting up a special apparatus on the first communication network and the second communication network, the point at which a communication failure is occurring on the first communication network or the second communication network can be identified. Moreover, since the communication conditions are determined based on the existing packets without using probing packets, it is possible to avoid an adverse effect on other communication due to an increase in traffic.

According to a second aspect of the present invention, there is provided a communication conditions determination system having a determination apparatus that determines communication conditions of a first communication network and a second communication network which are connected by a connection apparatus, wherein the determination apparatus comprises a unit that detects a packet passed through the second communication network, a first determination unit that determines whether the detect packet is a packet sent to the second communication network from the connection apparatus, a second determination unit that determines, if the packet is determined to be a packet sent to the second communication network from the connection apparatus, whether a source apparatus of the packet is the connection apparatus or an apparatus other than the connection apparatus, a summarization unit that individually summarizes packets whose respective source apparatuses are determined to be the connection apparatus and packets whose respective source apparatuses are determined to be an apparatus other than the connection apparatus, and a determination unit that compares individual summarized results and determines the communication conditions of the first communication network and the second communication network.

In the present invention, by determining whether a packet detected by the determination apparatus is a packet sent to the second communication network from the connection apparatus, only those packets that are sent through the connection apparatus to the second communication network from the first communication network and those packets that are sent to the second communication network from the connection apparatus can be used for summarization. In addition, in the present invention, by determining whether the source apparatus of the packet detected by the determination apparatus is the connection apparatus, packets passed through both the first communication network and the second communication network and packets passed through only the second communication network can be determined and those packets can be summarized separately for each group of packets. Then, in the present invention, by comparing the individual summarized results of the packets passed through both the first communication network and the second communication network and the packets passed through only the second communication network, a determination can be made as to which one of the first communication network and the second communication network is causing a communication failure. In this manner, in the present invention, without setting up a special apparatus on the first communication network and the second communication network, the point at which a communication failure is occurring on the first communication network or the second communication network can be identified. Moreover, since the communication conditions are determined based on the existing packets without using probing packets, it is possible to avoid an adverse effect on other communication due to an increase in traffic.

According to a third aspect of the present invention, in the communication conditions determination system of the second aspect, the first determination unit may make a determination based on a MAC (Media Access Control) address specified in the packet.

In the present invention, when the MAC address of the connection apparatus is specified, it can be determined that the packet is a packet sent to the second communication network from the connection apparatus.

According to a fourth aspect of the present invention, in the communication conditions determination system of the second aspect, when the connection apparatus has an address translation function, the first determination unit may make a determination based on a source IP (Internet Protocol) address specified in the packet.

In the present invention, when the connection apparatus has an address translation function, the IP address of the connection apparatus is specified in the packet as the source IP address, and thus, a determination can be made as to whether the packet is a packet sent to the second-communication network from the connection apparatus.

According to a fifth aspect of the present invention, in the communication conditions determination system of the second aspect, the determination apparatus may further comprise a database in which IP addresses of the connection apparatus and an apparatus on the second communication network other than the connection apparatus are stored, and the first determination unit may make a determination based on a result of checking a source IP address specified in the packet against stored contents of the database.

In the present invention, by checking the source IP address of the packet against the stored contents of the database, a determination can be made as to whether the packet is a packet sent to the second communication network from the connection apparatus.

According to a sixth aspect of the present invention, in the communication conditions determination system of the second aspect, the second determination unit may make a determination based on a protocol of the packet.

In the present invention, when the protocol of a packet is a protocol, such as RIP (Routing Information Protocol), OSPF (Open Shortest Path First), ARP (Address Resolution Protocol), DHCP (Dynamic Host Configuration Protocol), or DNS (Domain Naming System), in which only the connection apparatus performs communication through the second communication network and a packet is not sent from a communication apparatus on the first communication network to the second communication network, the source apparatus of the packet can be determined to be the connection apparatus. When the protocol is a protocol, such as HTTP (Hyper Text Transfer Protocol) or FTP (File Transfer Protocol), which is used by general communication apparatuses, the source apparatus of the packet can be determined to be an apparatus other than the connection apparatus.

According to a seventh aspect of the present invention, in the communication conditions determination system of the second aspect, the second determination unit may make a determination based on a destination IP address specified in the packet.

In the present invention, when the destination of a packet is a specific apparatus such as a destination server computer of a Ping packet sent for monitoring communications or a DNS server computer, the packet can be determined to be a packet sent from the connection apparatus.

According to an eighth aspect of the present invention, in the communication conditions determination system of the second aspect, the determination apparatus may further comprise a database in which IP ad dresses of the connection apparatus and an apparatus on the second communication network other than the connection apparatus are stored, and the second determination unit may make a determination based on a result of checking a source IP address specified in the packet against stored contents of the database.

In the present invention, by checking the source IP address of a packet against the stored contents of the database, a determination can be made as to whether the source apparatus of the packet is the connection apparatus or an apparatus other than the connection apparatus.

According to a ninth aspect of the present invention, in the communication conditions determination system of the second aspect, the summarization unit may calculate statistical values based on the summarization, and the determination unit may make a determination based on a result of an identity test performed on the statistical values which are the summarized results.

In the present invention, the individual summarized results are expressed by statistical values such as the average value and standard deviation of values such as a delay time and a loss rate, and an identity test is performed on each statistical value using testing methods such as a t test and an F test. When they are determined to be identical, it can be determined that a communication failure is occurring on the second communication network. When they are determined not to be identical, it can be determined that a communication failure is occurring on the first communication network.

According to a tenth aspect of the present invention, there is provided a determination apparatus that determines communication conditions of a first communication network and a second communication network which are connected by a connection apparatus, the determination apparatus comprising a unit that detects a packet passed through the second communication network, a unit that determines whether the detect packet is a packet sent to the second communication network from the connection apparatus, a unit that determines, if the packet is determined to be a packet sent to the second communication network from the connection apparatus, whether a source apparatus of the packet is the connection apparatus or an apparatus other than the connection apparatus, a unit that individually summarizes packets whose respective source apparatuses are determined to be the connection apparatus and packets whose respective source apparatuses are determined to be an apparatus other than the connection apparatus, and a unit that compares individual summarized results and determines the communication conditions of the first communication network and the second communication network.

In the present invention, by determining whether a detected packet is a packet sent to the second communication network from the connection apparatus, only those packets that are sent through the connection apparatus to the second communication network from the first communication network and those packets that are sent to the second communication network from the connection apparatus can be used for summarization. In addition, in the present invention, by determining whether the source apparatus of the detected packet is the connection apparatus, packets passed through both the first communication network and the second communication network and packets passed through only the second communication network can be determined and those packets can be summarized separately for each group of packets. Then, in the present invention, by comparing the individual summarized results of the packets passed through both the first communication network and the second communication network and the packets passed through only the second communication network, a determination can be made as to which one of the first communication network and the second communication network is causing a communication failure. In this manner, in the present invention, without setting up a special apparatus on the first communication network and the second communication network, the point at which a communication failure is occurring on the first communication network or the second communication network can be identified. Moreover, since the communication conditions are determined based on the existing packets without using probing packets, it is possible to avoid an adverse effect on other communication due to an increase in traffic.

According to the communication conditions determination method, communication conditions' determination system, and determination apparatus of the present invention, in a communication system in which a first communication network such as a customer network and a second communication network such as a carrier network are connected by a connection apparatus such as a router, when a communication failure occurs, the communication conditions of each communication network are determined and furthermore the point at which the communication failure has occurred is identified. In the present invention, by detecting a packet passed through the second communication network and determining, based on information such as a MAC address and a source IP address specified in the packet, whether the packet is a packet sent to the second communication network from the connection apparatus, only those packets that are sent through the connection apparatus to the second communication network from the first communication network and those packets that are sent to the second communication network from the connection apparatus are used to determine the evaluation of the communication conditions. In addition, in the present invention, by determining whether the source apparatus of a packet determined to be sent to the second communication network from the connection apparatus is the connection apparatus, based on information such as a protocol and a destination apparatus specified in the packet, those packets passed through both the first communication network and the second communication network and those packets passed through only the second communication network are determined. Then, in the present invention, packets whose respective source apparatuses are determined to be the connection apparatus and packets whose respective source apparatuses are determined to be an apparatus other than the connection apparatus are summarized separately for each group of packets. Then, by comparing the individual summarized results, the communication conditions of the first communication network and the second communication network are determined. Specifically, the individual summarized results are expressed by statistical values such as the average value and standard deviation of values such as a delay time and a loss rate, and an identity test is performed on each statistical value using testing methods such as a t test and an F test. When they are determined to be identical, it is determined that a communication failure is occurring on the second communication network. When they are determined not to be identical, it is determined that a communication failure is occurring on the first communication network.

By this configuration, the present invention provides an excellent effect such as the ability to identify the point at which a communication failure is occurring on the first communication network or the second communication network, without setting up a special apparatus on the first communication network and the second communication network. Moreover, the present invention provides an excellent effect such as the ability to avoid an adverse effect on other communication due to an increase in traffic because the communication conditions are determined based on the existing packets without using probing packets.

The above and further objects and features of the invention will more fully be apparent from the following detailed description with accompanying drawings.

BRIEF DESCRIPTION OF THE SEVERAL VIEWS OF THE DRAWINGS

FIG. 2 is a block diagram showing a configuration of a determination apparatus used in the communication conditions determination system of the present invention;

FIG. 6 is a chart conceptually showing stored contents of a database included in the determination apparatus used in the communication conditions determination system of the present invention;

FIG. 9 is a chart showing summarized results of quality values in the communication conditions determination system of the present invention; and FIG. 10 is an illustrative diagram showing contents displayed on the determination apparatus used in the communication conditions determination system of the present invention.

DETAILED DESCRIPTION OF THE INVENTION

Figure 1:
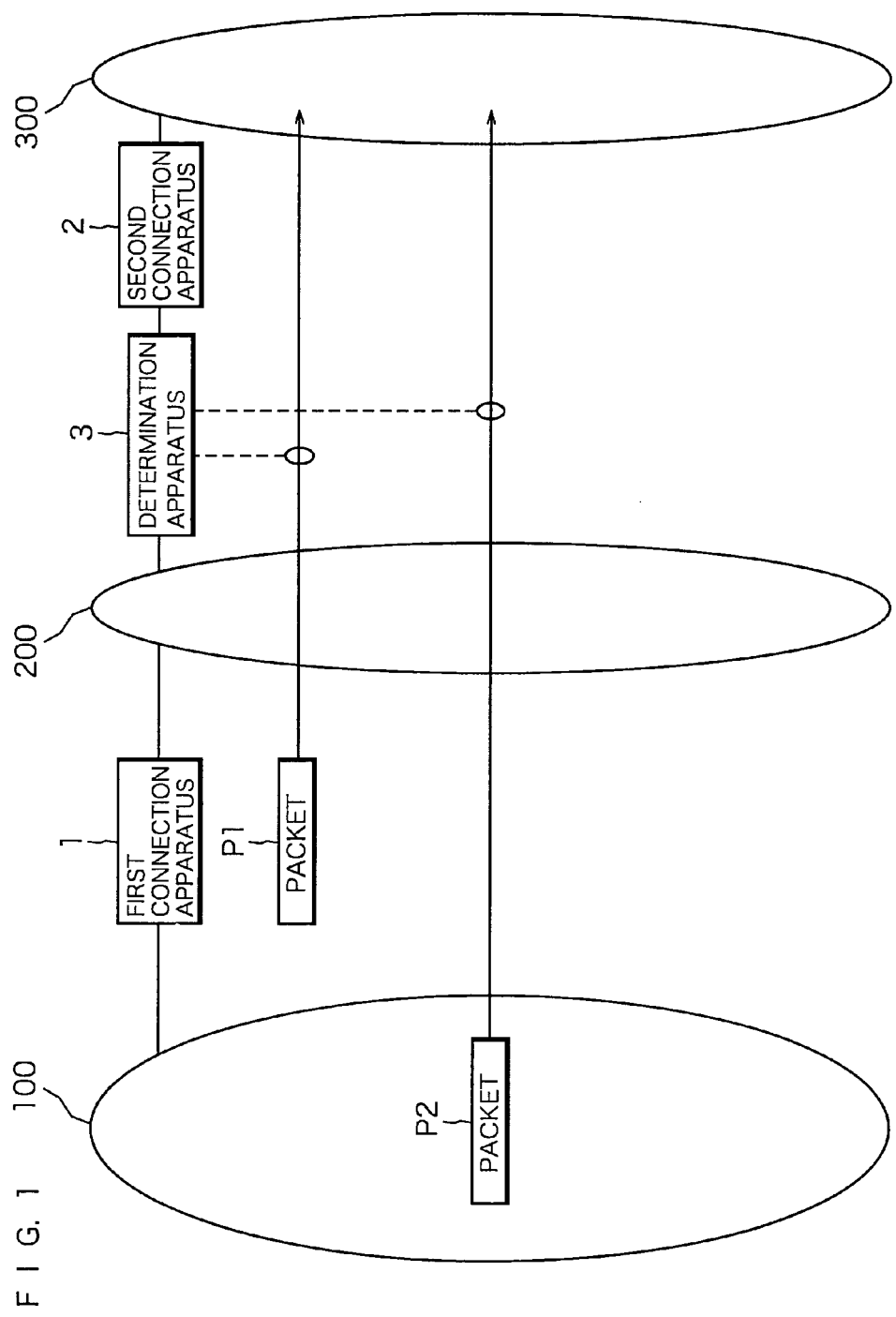
FIG. 1 is a conceptual diagram showing a configuration of a communication conditions determination system of the present invention.

The present invention will be described in detail below based on the drawings showing an embodiment of the present invention. FIG. 1 is a conceptual diagram showing a configuration of a communication conditions determination system of the present invention. The communication conditions determination system of the present invention can be used, when, for example, a communications entity such as an ISP (Internet Service Provider) that provides communication services recognizes occurrence of a communication failure in a communication service provided to a customer by the communications entity, to determine the communication conditions of a communication network and identify the point at which the communication failure has occurred.

In FIG. 1, reference numeral 100 denotes a first communication network such as a customer network administered by a customer. The first communication network 100 is connected by a first connection apparatus 1 such as a router to, a second communication network 200 such as a carrier network administered, as a backbone, by a large communications entity such as a Type I carrier. Furthermore, the second communication network 200 is connected by a second connection apparatus 2 such as a router to a third communication network 300 such as an ISP network administered by a communications entity such as the aforementioned ISP. A determination apparatus 3 that detects a packet sent to the third communication network 300 through the second communication network 200 and determines communication conditions based on the detected packet is connected to the second connection apparatus 2 or to a side of the second connection apparatus 2 where the second communication network 200 is present or the third communication network 300 is present. The second connection apparatus 2 and the determination apparatus 3 may be configured as a single apparatus. Note that FIG. 1 shows a configuration in which the determination apparatus 3 is arranged on the side of the second connection apparatus 2 where the second communication network 200 is present.

In FIG. 1, reference numeral P1 denotes a packet sent through the second communication network 200 to the third communication network 300 from the first connection apparatus 1, and reference numeral P2 denotes a packet sent through the second communication network 200 to the third communication network 300 from the first communication network 100 via the first connection apparatus 1. The determination apparatus 3 detects both of the packets P1 and P2 and determines communication conditions based on the detected packets. Specifically, the packets sent from the first connection apparatus 1 and detected by the determination apparatus 3 include both of the packet P1 whose source is the first connection apparatus 1 and a packet received by and sent from the first connection apparatus 1, i.e., the packet P2 that passes through the first connection apparatus 1. Note that, as will be described later, the determination apparatus 3 detects not only the packets P1 and P2 shown in FIG. 1 but also a packet sent through the second communication network 200 to the first connection apparatus 1 from the third communication network 300. The determination apparatus 3 then compares the packet with a packet sent in response to the packet from the first connection apparatus 1 to the third communication network 300, and thereby determines the communication conditions of the second communication network 200.

FIG. 2 is a block diagram showing the configuration of the determination apparatus 3 used in the communication conditions determination system of the present invention. The determination apparatus 3 includes a control means 30, such as a CPU, that controls the entire apparatus; a secondary storage means 31, such as a CD-ROM drive, that reads various information from a storage medium, such as a CD-ROM, having stored thereon various information such as a computer program and data for the determination apparatus of the present invention; a recording means 32, such as a hard disk, that stores the various information read from the secondary storage means 31; a storage means 33, such as RAM, that temporarily stores information; a detection means 34 that detects a packet passed through the second communication network 200; a timer means 35 used as a timer; and a display means 36 such as a monitor. The determination apparatus 3 allows the storage means 33 to store therein the computer program and data stored on the recording means 32 and allows the computer program to be executed by control by the control means 30, and thereby implements a function according to the present invention. Note that packet detection by the detection means 34 does not mean capturing of a packet sent to the third communication network 300 through the second communication network 200 but does mean packet detection by copying packet data contained in a passed through packet by a mirroring function and obtaining the copied packet data. Note also that part of a storage region of the recording means 32 is used as a database 32*a* that stores information such as IP (Internet Protocol) addresses which indicate the locations of various apparatuses on the communication networks, such as apparatuses on the first communication network 100, the first connection apparatus 1, apparatuses on the third communication network 300, and MAC (Media Access Control) addresses which are unique identification information on the apparatuses.

Figure 3:
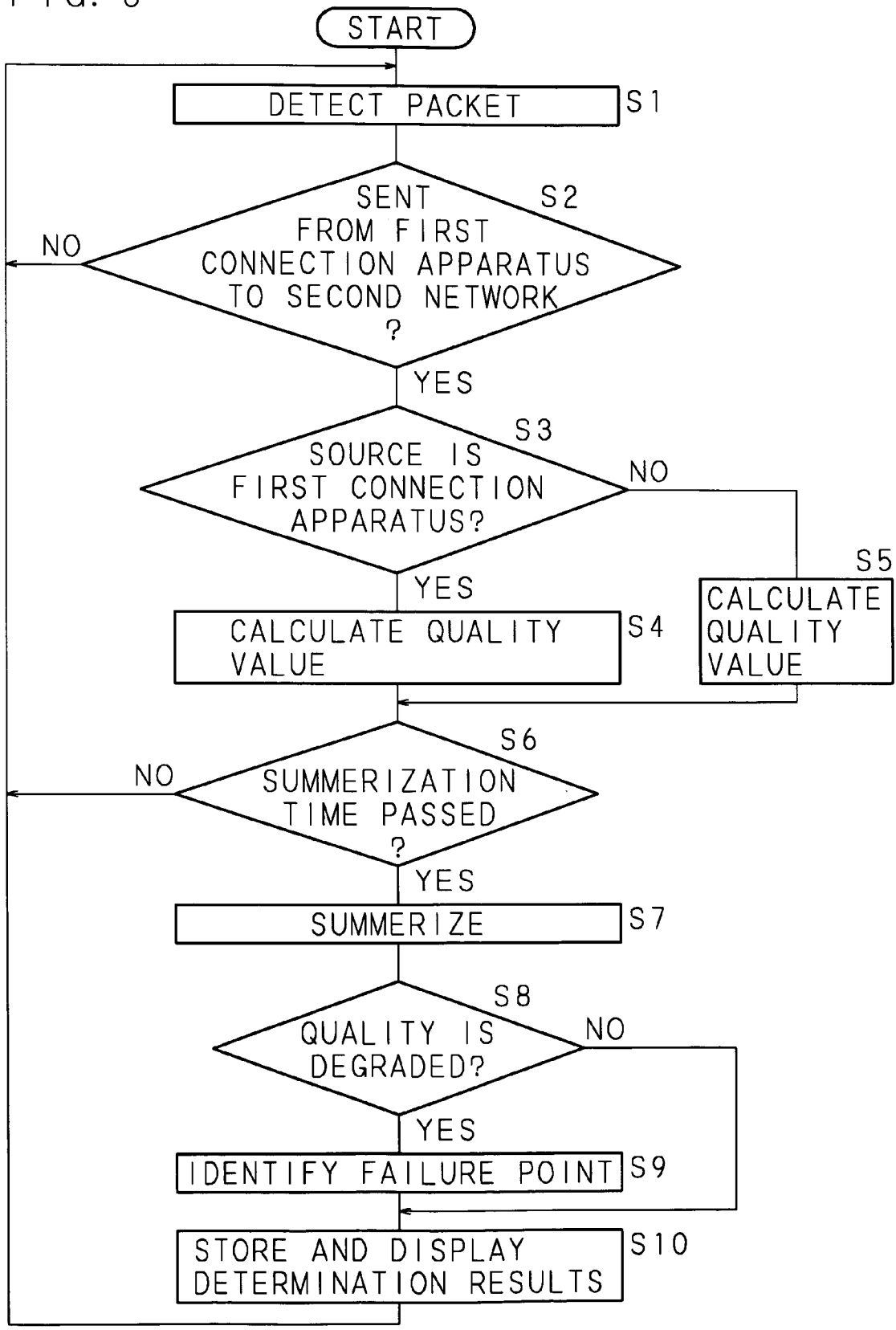
FIG. 3 is a flowchart showing a communication conditions determination process performed by the determination apparatus used in the communication conditions determination system of the present invention.

Now, a process performed by the communication conditions determination system of the present invention will be described. FIG. 3 is a flowchart showing a communication conditions determination process performed by the determination apparatus 3 used in the communication conditions determination system of the present invention. The determination apparatus 3 detects, by the detection means 34, a packet sent to the third communication network 300 through the second communication network 200, based on control by the control means 30 (step S1), and determines whether the detected packet is a packet sent to the second communication network 200 from the first connection apparatus 1 (step S2). At step S2, it is determined whether the packet detected by the determination apparatus 3 is a packet sent through the first connection apparatus 1 to the second communication network 200 from the first communication network 100 or a packet sent to the second communication network 200 from the first connection apparatus 1, or a packet that has-nothing to do with the first connection apparatus 1. In the communication conditions determination system of the present invention, only those packets sent through the first connection apparatus 1 to the second communication network 200 from the first communication network 100 and those packets sent to the second communication network 200 from the first connection apparatus 1 are used for summarization.

If, at step S2, the packet is determined to be a packet sent to the second communication network 200 from the first connection apparatus 1 ("YES" at step S2), the determination apparatus 3 determines based on control by the control means 30 whether the source apparatus of the packet is the first connection apparatus 1 or an apparatus other than the first connection apparatus 1 (step S3). If the source apparatus of the packet is determined to be an apparatus other than the first connection apparatus 1, it is determined that the packet has passed through both the first communication network 100 and the second communication network 200. On the other hand, if the source apparatus of the packet is determined to be the first connection apparatus 1, it is determined that the packet has passed through only the second communication network 200.

At step S3, if the source apparatus of the packet is determined to be the first connection apparatus 1 ("YES" at step S3), the determination apparatus 3 calculates the quality value of communication, by control of the control means 30, the value being preset for each type of a packet based on a protocol (step S4). On the other hand, if, at step S3, the source apparatus of the packet is determined to be an apparatus other than the first connection apparatus 1 ("NO" at step S3), the determination apparatus 3 calculates the quality value of the packet, by control of the control means 30, the value being preset for each type of a packet based on a protocol (step S5). The quality values of communication shown at steps S4 and S5 are values indicating communication quality such as the presence/absence of packet loss and a delay which are calculated based on values such as a timestamp specified in the packet and a sequence number.

After the quality value of communication is calculated separately for each source apparatus and each protocol at step S4 or S5, the determination apparatus 3 determines based on control by the control means 30 whether the summarization time which is preset by the timer means 35 has passed (step S6). The determination of the communication conditions is made every summarization time such as one minute.

At step S6, if it is determined that the summarization time has passed ("YES" at step S6), the determination apparatus 3 summarizes, by control by the control means 30, the quality values calculated at steps S4 and S5 separately for a packet whose source apparatus is determined to be the first connection apparatus 1 and its protocol, and a packet whose source apparatus is determined to be an apparatus other than the first connection apparatus 1 and its protocol (step S7). Then, the determination apparatus 3 determines, based on the summarized results, whether the communication quality is degraded (step S8). At steps S7 and S8, the quality values such as a packet loss rate and a delay time are expressed by statistical values such as an average value and a standard deviation, and the statistical values are compared with preset threshold values, whereby a determination is made as to whether the communication quality is degraded.

At step S8, if it is determined that there is a communication failure that causes degradation in communication quality ("YES" at step S8), the determination apparatus 3 compares, by control by the control means 30, the statistical values which are the summarized results obtained at step S7, determines the communication conditions of the first communication network 100 and the second communication network 200, and identifies a failure point based on the determination results (step S9). The determination results for the communication conditions and the identified failure point are stored on the recording means 32 and displayed on the display means 36 (step S10). After initializing the summarization time, the determination apparatus 3 returns to step S1 and repeats a subsequent process for the next summarization time.

The identification of the failure point at step S9 is performed by performing identity tests using testing methods such as a t test and an F test, on each statistical value. Specifically, if they are determined to be identical, a communication failure occurring on the second communication network 200 is considered to affect both the quality value of the packet passed through both the first communication network 100 and the second communication network 200 and the quality value of the packet passed through only the second communication network 200, and thus, the second communication network 200 is identified as the failure point. On the other hand, if they are determined not to be identical, a communication failure occurring on the first communication network 100 is considered to affect the quality value of the packet passed through both the first communication network 100 and the second communication network 200 but not the quality value passed through only the second communication network 200, and thus, the first communication network 100 is identified as the failure point. Note that at step S10 a display does not necessarily need to be provided on the display means 36; a notification may be made by a method such as an output of the contents to be displayed to another apparatus.

If it is determined, at step S8, that the communication quality is not degraded ("NO" at step S8), the determination apparatus 3 proceeds, by control by the control means 30, to step S10 and stores and displays a result of the determination (step S10).

If, at step S6, it is determined that the summarization time has not passed ("NO" at step S6), the determination apparatus 3 returns, by control by the control means 30, to step S1 and repeats a subsequent process.

If, at step S2, it is determined that the packet is not a packet sent to the second communication network 200 from the first connection apparatus 1 ("NO" at step S2), the determination apparatus 3 determines, by control by the control means 30, that the detected packet is not used for summarization, and thus, returns to step S1 and repeats a subsequent process.

When the determination apparatus 3 is used to determine communication conditions for a packet sent through the second communication network 200 to the first connection apparatus 1 from the third communication network 300, the determination apparatus 3 also detects a packet sent to the second communication network 200 through the third communication network 300. The determination apparatus 3 then determines whether the destination apparatus of the detected packet is the first connection apparatus 1 based on, for example, an IP address indicating the destination. If the destination apparatus is the first connection apparatus 1, the quality value is calculated, as will be described later, and is used to determine the communication conditions.

Now, a specific example of each element process in the aforementioned communication conditions determination process will be described. At step S2 in the communication conditions determination process which is shown using FIG. 3, a determination process is performed by methods such as a determination by a MAC address specified in the packet, a determination by an IP address, and a check against the stored contents of the database 32a.

Figure 4:
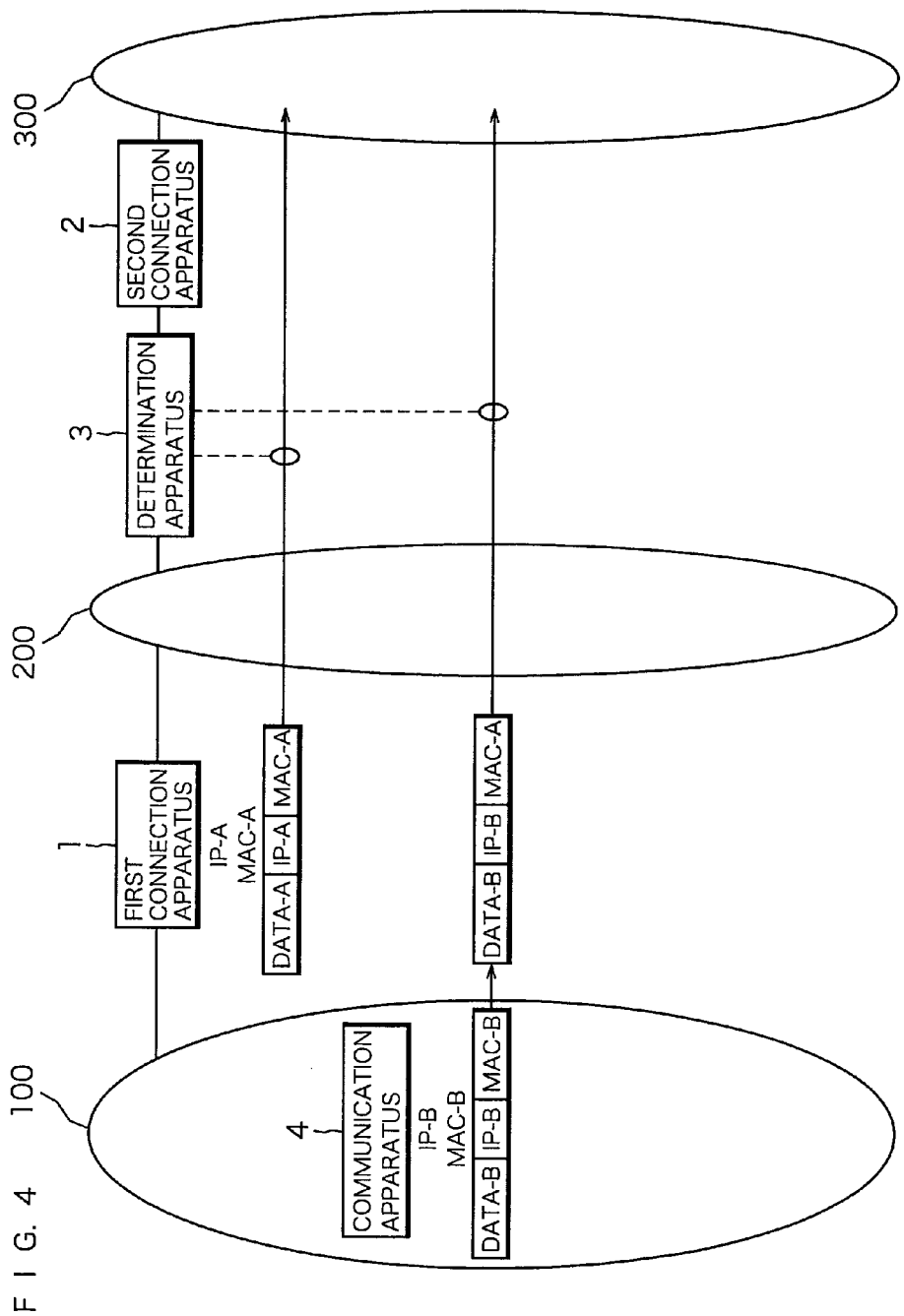
FIG. 4 is a conceptual diagram showing a determination processing method performed by the determination apparatus used in the communication conditions determination system of the present invention.

First, a determination process based on a MAC address will be described. FIG. 4 is a conceptual diagram showing a determination processing method performed by the determination apparatus 3 used in the communication conditions determination system of the present invention. Reference numeral 4 in FIG. 4 denotes a communication apparatus, such as a customer's personal computer, provided on the first communication network 100. The first connection apparatus 1 is assigned with IP-A serving as an IP address which indicates the location on the communication network and MAC-A serving as a MAC address which is unique identification information on the apparatus. The communication apparatus 4 is assigned with IP-B serving as an IP address and MAC-B serving as a MAC address.

A packet sent from the first connection apparatus 1 contains data (DATA-A), an IP address (IP-A) indicating, as the header information of the packet, the first connection apparatus 1 which is the source, and a MAC address (MAC-A). A packet sent from the communication apparatus 4 contains data (DATA-B), an IP address (IP-B) indicating, as the header information of the packet, the communication apparatus 4 which is the source, and a MAC address (MAC-B). When the packet sent from the communication apparatus 4 is received by the first connection apparatus 1 and then sent onto the second communication network 200, the first connection apparatus 1 rewrites the MAC address of the received packet from the MAC address of the communication apparatus 4 to the MAC address of the first connection apparatus 1.

Therefore, when the MAC address of the source of a packet detected by the determination apparatus 3 is MAC-A which indicates the first connection apparatus 1, the packet can be determined to be a packet sent through the first connection apparatus 1 to the second communication network 200 from the first communication network 100 or a packet sent to the second communication network 200 from the first connection apparatus 1, i.e., a packet sent to the second communication network 200 from the first connection apparatus 1. Note that by pre-storing the MAC address of the first connection apparatus 1 in the database 32a, for example, the MAC addresses can be used for determination. A packet sent to the first connection apparatus 1 through the second communication network 200 and a packet whose destination is the communication apparatus 4 each contain, as the MAC address of the destination, the MAC address (MAC-A) of the first connection apparatus 1. Therefore, when the MAC address of the destination of a packet detected by the determination apparatus 3 is MAC-A which is the MAC address of the first connection apparatus 1, the packet can be determined to be a packet sent to the first connection apparatus 1.

Figure 5:
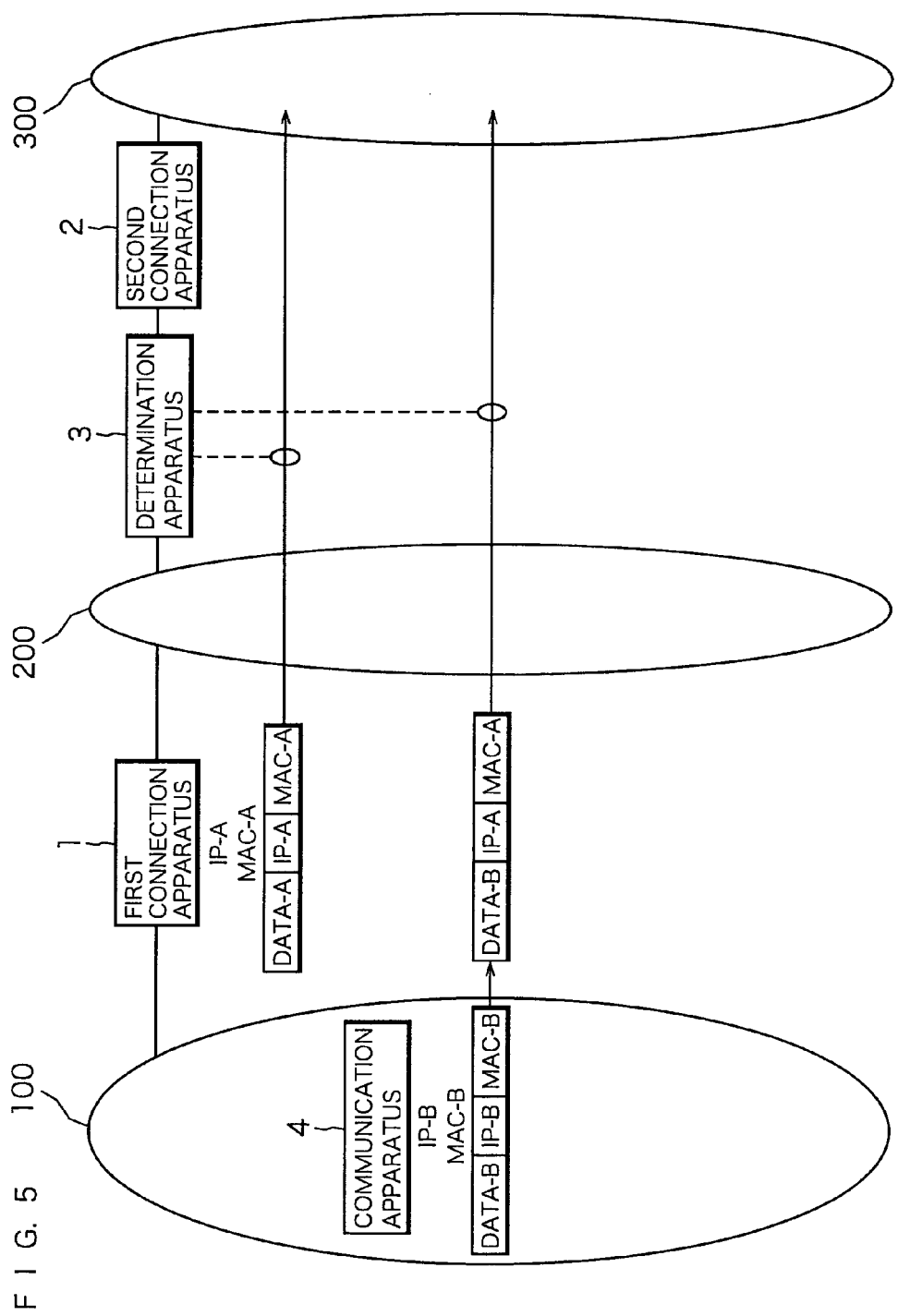
FIG. 5 is a conceptual diagram showing a determination processing method performed by the determination apparatus used in the communication conditions determination system of the present invention.

Next, a determination process based on an IP address will be described. FIG. 5 is a conceptual diagram showing a determination processing method performed by the determination apparatus 3 used in the communication conditions determination system of the present invention. In the same system as that shown in FIG. 4, in the case in which the first connection apparatus 1 has an address translation function called "NAT", when a packet sent from the communication apparatus 4 is received by the first connection apparatus 1 and then sent onto the second communication network 200, the first connection apparatus 1 rewrites not only the MAC address but also the IP address of the received packet from the IP address of the communication apparatus 4 to the IP address of the first connection apparatus 1.

Therefore, when the IP address which indicates the source apparatus of a packet detected by the determination apparatus 3 is IP-A which indicates the first connection apparatus 1, the packet can be determined to be a packet sent through the first connection apparatus 1 to the second communication network 200 from the first communication network 100 or a packet sent to the second communication network 200 from the first connection apparatus 1, i.e., a packet sent to the second communication network 200 from the first connection apparatus 1. Note that by pre-storing the IP addresses of the first connection apparatus 1 in the database 32a, for example, the IP addresses can be used for determination. A packet sent to the first connection apparatus 1 through the second communication network 200 and a packet whose destination is the communication apparatus 4 each contain, as the IP address of the destination, the IP address (IP-A) of the first connection apparatus 1. Therefore, when the IP address of the destination of a packet detected by the determination apparatus 3 is IP-A which is the IP address of the first connection apparatus 1, the packet can be determined to be a packet sent to the first connection apparatus 1.

Next, a determination process based on a check against the database 32a will be described. FIG. 6 is a chart conceptually showing the stored contents of the database 32a included in the determination apparatus 3 used in the communication conditions determination system of the present invention. The database 32a contains, as records, customer IDs (Identifications) that identify customers, the IP addresses of the first connection apparatus 1, and IP addresses assigned to communication apparatuses 4 on the first communication network 100 which are associated with one another. For example, the customer ID "CU0001" is associated with the IP address "10.10.10.2" of the first connection apparatus 1 and the IP address "192.168.2.0/24" on the first communication network 100. Note that the IP address "192.168.2.0/24" indicates that a communication apparatus 4 on the first communication network 100 is assigned with any of the IP addresses between "192.168.2.1" and "192.168.2.255". The stored contents of the database 32a are set manually or based on route information of a packet according to a routing protocol detected by the determination apparatus 3.

Based on a result obtained by checking the IP address which indicates the source apparatus of a packet detected by the determination apparatus 3 against the stored contents of the database 32a stored in the above-described manner, the determination process at step S2 can be performed. For example, in the case of determining communication conditions for a customer with a customer ID of CU0001, when the IP address which indicates the source apparatus of a packet detected by the determination apparatus 3 is "10.10.10.2" and any of the IP addresses between "192.168.2.1" and "192.168.2.255", the packet can be determined to be a packet sent to the second communication network 200 from the first connection apparatus 1 having an IP address of "10.10.10.2" or a packet sent through the first connection apparatus 1 having an IP address of "10.10.10.2" to the second communication network 200 from the first communication network 100, i.e., a packet sent to the second communication network 200 from the first connection apparatus 1. In addition, by checking the IP address which indicates the destination apparatus of a packet detected by the determination apparatus 3 against the stored contents of the database 32a, a determination can be made whether the packet is a packet sent to the first connection apparatus 1 or a packet sent to the second communication network 200.

At step S3 in the communication conditions determination process shown using FIG. 3, a determination process is performed by methods such as a determination by a protocol of the packet and an IP address specified in the packet and a check against the stored contents of the database 32a.

First, a determination process based on a protocol will be described. When the protocol of a packet detected by the determination apparatus 3 is a protocol, such as RIP (Routing Information Protocol), OSPF (Open Shortest Path First), ARP (Address Resolution Protocol), DHCP (Dynamic Host Configuration Protocol), or DNS (Domain Naming System), in which only the first connection apparatus 1 performs communication through the second communication network 200 and a packet is not sent from the communication apparatus 4 to the second communication network 200, the source apparatus is determined to be the first connection apparatus 1. When the protocol is a protocol, such as HTTP (Hyper Text Transfer Protocol) or POP (Post Office Protocol), which is used by the communication apparatus 4 but not by the first connection apparatus 1, the source apparatus is determined to be an apparatus other than the first connection apparatus 1, i.e., the communication apparatus 4 in the present embodiment. Note that the same applies to a packet sent from the third communication network 300 to the first connection apparatus 1 which is the destination.

Now, a determination process based on a destination IP address will be described. When the IP address which indicates the destination apparatus of a packet detected by the determination apparatus 3 indicates a pre-registered specific apparatus such as a specific server computer set up on the third communication network 300 as the destination of a Ping packet for monitoring communications or a DNS server computer on the third communication network 300, the source apparatus is determined to be the first connection apparatus 1. When the destination apparatus is an apparatus other than the pre-registered specific apparatus, the source apparatus is determined to be an apparatus other than the first connection apparatus 1, i.e., the communication apparatus 4 in the present embodiment. Note that the same applies to a packet sent from the third communication network 300 to the first connection apparatus 1 which is the destination.

Now, a determination process based on a check against the database 32a will be described. When the determination apparatus 3 having the database 32a whose stored contents are shown in FIG. 6 is used, the determination process at step S3 can be performed based on a result obtained by checking the IP address which indicates the source apparatus of a packet detected by the determination apparatus 3 against the stored contents of the database 32a. For example, in the case of determining communication conditions for a customer with a customer ID of CU0001, when the IP address which indicates the source apparatus of a packet detected by the determination apparatus 3 is "10.10.10.2", the source apparatus of the packet is determined to be the first connection apparatus 1. When the IP address is any of the IP addresses between "192.168.2.1" and "192.168.2.255", the source apparatus of the packet is determined to be an apparatus other than the first connection apparatus 1, i.e., the communication apparatus 4 in the present embodiment. Note that the same applies to the case of checking the destination IP address of a packet.

At steps S4 and S5 in the communication conditions determination process shown using FIG. 3, the quality value of communication is calculated by a method which is set for each type of a packet based on a protocol such as TCP (Transmission Control Protocol) or OSPF.

Figure 7A:
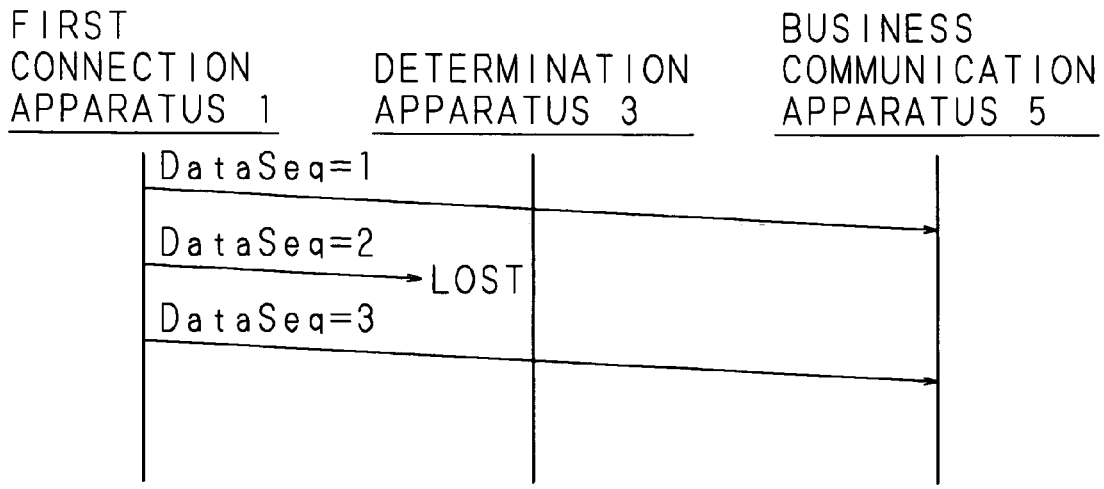
FIGS. 7A to 7C are sequence diagrams showing communication processes in the communication conditions determination system of the present invention.
Figure 7B:
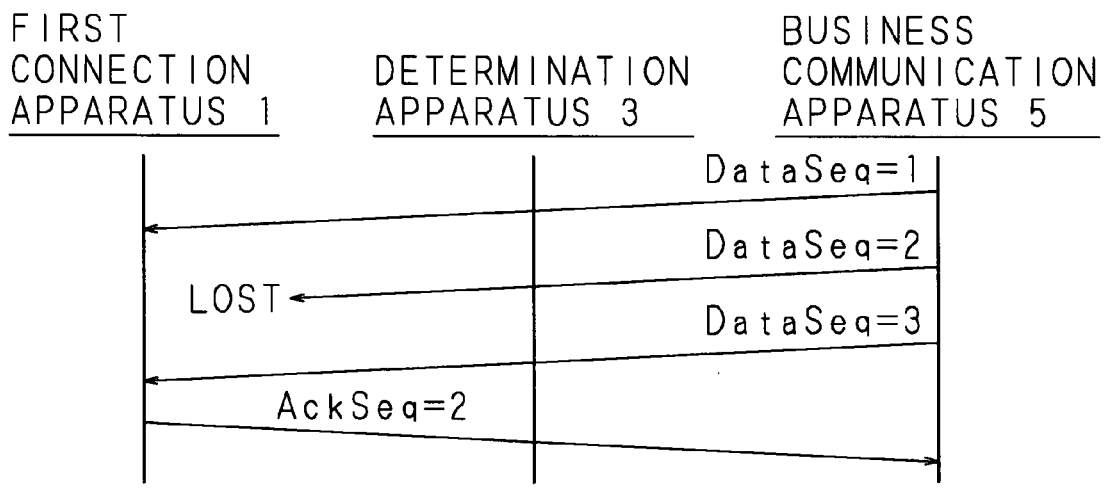
Figure 7C:
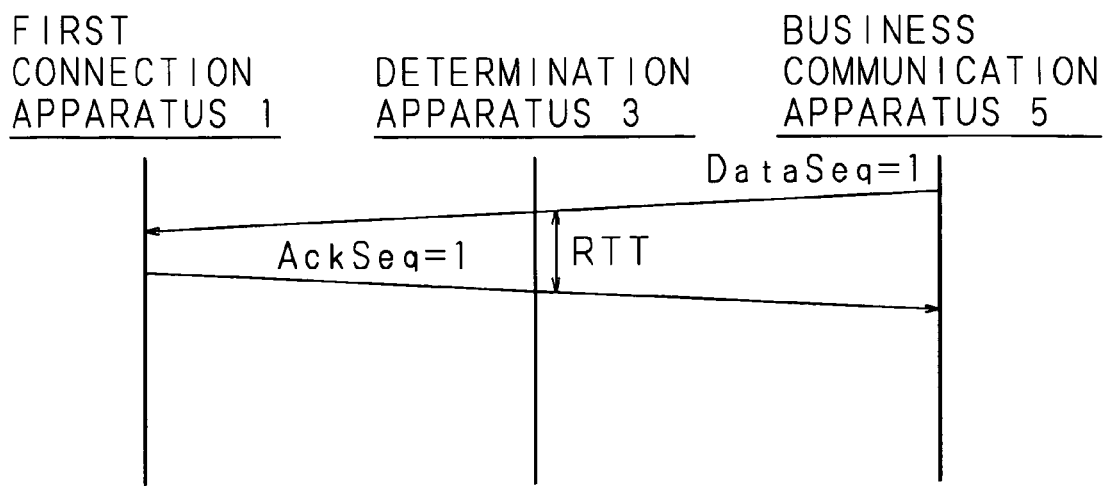

First, an exemplary calculation of the quality value for the case in which the protocol is TCP will be described. FIGS. 7A to 7C are sequence diagrams showing communication processes in the communication conditions determination system of the present invention. FIGS. 7A to 7C show a state in which packet transmission/reception based on TCP is performed between the first connection apparatus 1 and a business communication apparatus 5 set up on the third communication network 300 and transmitted/received packets are detected by the determination apparatus 3. There is a predetermined agreement on a packet to be sent based on TCP that the packet is assigned with a sequence number (Seq=1, 2, 3, . . . ) indicating the order, and when a receiving apparatus succeeds in receiving a packet an Ack packet indicating the reception of the packet is returned, and when the receiving apparatus fails to receive a packet an Ack packet requesting for retransmission of the packet is returned.

FIG. 7A shows a state in which packets whose respective sequence numbers (DataSeq) are 1, 2, and 3 are sequentially sent from the first connection apparatus 1 to the business communication apparatus 5. FIG. 7A shows a state in which the packet with a sequence number of 2 is lost while passing through the second communication network 200 and cannot be detected by the determination apparatus 3. In this case, since the determination apparatus 3 can recognize the loss of the packet from the sequence number, the packet loss rate as a quality value can be calculated.

FIG. 7B shows a state in which packets (DataSeq=1, 2, 3, . . . ) whose respective sequence numbers are 1, 2, and 3 are sequentially sent from the business communication apparatus 5 to the first connection apparatus 1. FIG. 7B shows a state in which the packet with a sequence number of 2 is lost after passing through the determination apparatus 3 and while passing through the second communication network 200, and thus, an Ack packet (AckSeq=2) requesting for retransmission of the packet with a sequence number of 2 is sent from the first connection apparatus 1 to the business communication apparatus 5. In this case, since the determination apparatus 3 can recognize the loss of the packet from the sequence number of the packet for which a retransmission request is made by the Ack packet, the packet loss rate as a quality value can be calculated.

FIG. 7C shows a state in which a packet is sent from the business communication apparatus 5 to the first connection apparatus 1 and an Ack packet indicating the success of reception is sent from the first connection apparatus 1 to the business communication apparatus 5. In FIG. 7C, as the time difference between the time at which the packet (DataSeq=1) sent from the business communication apparatus 5 is detected by the determination apparatus 3 and the time at which the Ack packet (AckSeq=1) returned from the first connection apparatus 1 is detected by the determination apparatus 3, the RTT (Round Trip Time) of the packet from the determination apparatus 3 to the first connection apparatus 1 can be calculated; thus, based on the calculated RTT, the delay time of the packet and an increment of the delay time can be calculated as quality values.

Now, the calculation of the quality value for the case in which the protocol is OSPF will be described. The determination apparatus 3 calculates, as a quality value, the packet loss rate based on a Hello packet sent, by OSPF which is a routing protocol, from the first connection apparatus 1 at a predetermined transmission interval. Specifically, given that the measurement time period is W and the transmission interval specified in a Hello packet is C, it can be predicted that Hello packets are sent W/C times during the measurement time period W. Hence, given that the number of packets actually detected by the determination apparatus 3 is R and the predicted value of the number of packets is $R_{es}$, the packet loss rate can be expressed by the following equation (1):

$$\text{Loss rate}=(R_{es}-R)/R_{es} \qquad (1)$$

Figure 8:
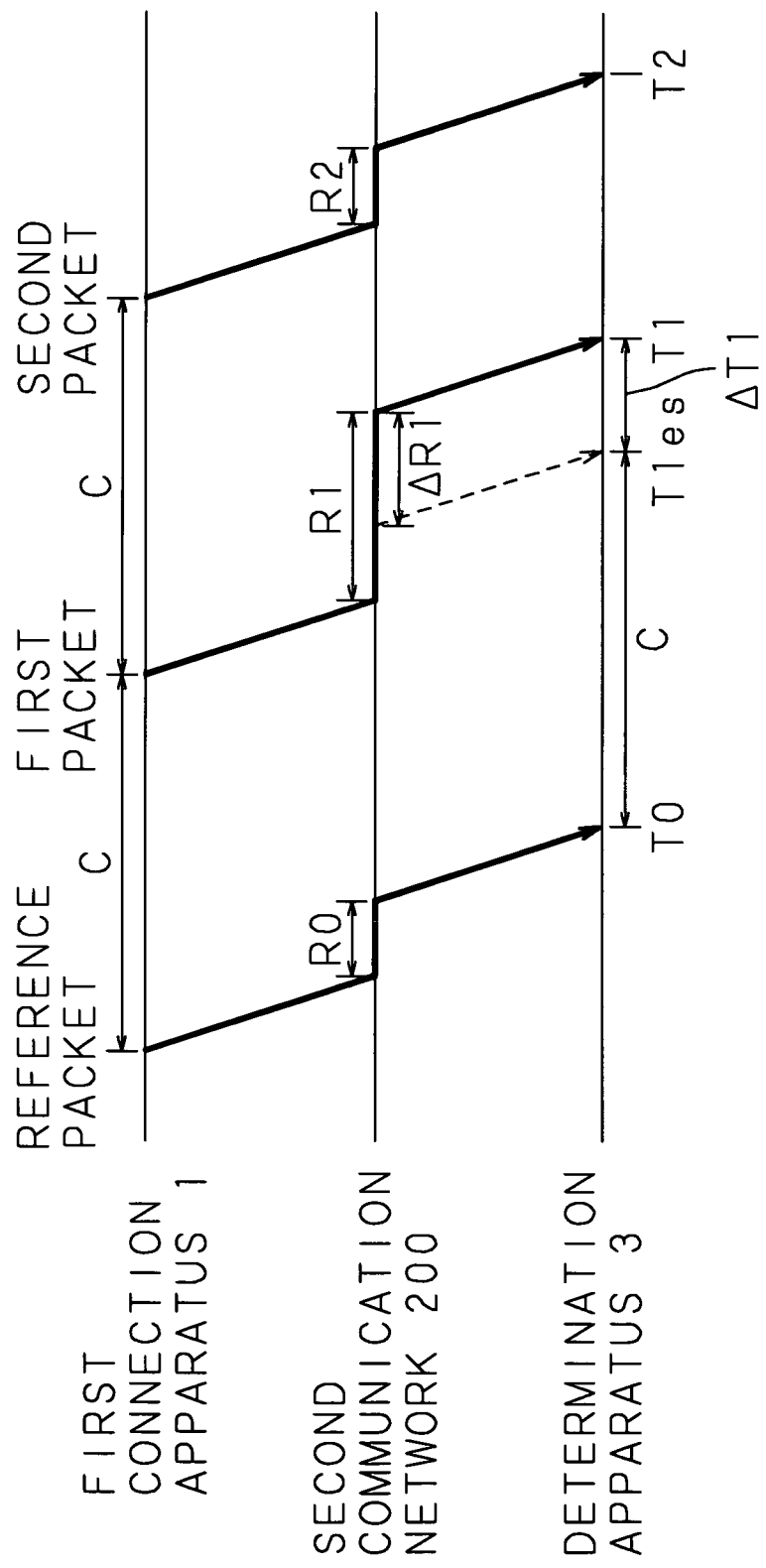
FIG. 8 is an illustrative diagram conceptually showing a method of calculating a quality value in the communication conditions determination system of the present invention.

FIG. 8 is an illustrative diagram conceptually showing a method of calculating a quality value in the communication conditions determination system of the present invention. The quality value is calculated using, for example, a method described in Japanese Patent Application Laid-Open No. 2006-13969 filed by the applicant of the application for the present invention. FIG. 8 shows the passage of time for Hello packets sent from the first connection apparatus 1 to be detected by the determination apparatus 3 through the second communication network 200. The Hello packets are sent from the first connection apparatus 1 at a transmission interval C of 10 seconds, for example. Note that here the packets are represented, in the order of transmission, as a reference packet, a first packet, and a second packet. A time period from when the reference packet is sent until the reference packet is detected by the determination apparatus 3, i.e., a delay time during which the reference packet stays on the second communication network 200, is represented by a reference delay time R0 and the time at which the reference packet is detected by the determination apparatus 3 is represented by a reference time T0. Since the Hello packets are sent at the transmission interval C, the time at which the i-th packet (i is a natural number) is detected by the determination apparatus 3 can be predicted as a predicted time $Ti_{es}$ which is expressed by the following equation (2):

$$Ti_{es}=T0+i\cdot C \qquad (2)$$

Given that the time at which the i-th packet is actually detected by the determination apparatus 3 is Ti, as the difference between the predicted and actual times, the increment $\Delta Ti$ of the delay time can be calculated by the following equation (3):

$$\Delta Ti=Ti-Ti_{es} \qquad (3)$$

As is also clear from FIG. 8, the increment $\Delta Ti$ of the delay time expressed by equation (3) corresponds to the increment $\Delta Ri$ of the delay time Ri during which the i-th packet stays on the second communication network 200, and thus, by using the calculated increment $\Delta Ti$ of the delay time as a quality value, the communication conditions of the second communication network 200 can be determined. Note that FIG. 8 shows a state in which i=1 and shows $\Delta T1$ as the difference between the predicted time $T1_{es}$ and the actual time T1 of the first packet.

At step S9 in the communication conditions determination process shown using FIG. 3, by comparing the summarized results of the quality values which are summarized for each transmission/reception apparatus, a failure point is identified. Since the summarized results of the quality values are expressed by statistical values such as an average value and a standard deviation, identity is tested on each statistical value by a test such as an F test or a t test. When they are found not to be identical as a result of at least one of the F and t tests, both populations are determined not to be identical.

First, the summarized results of the quality values will be described. FIG. 9 is a chart showing the summarized results of the quality values in the communication conditions determination system of the present invention. As shown in FIG. 9, the summarized results of the quality values are summarized for each first communication network 100 represented by a customer ID, with respect to a packet whose source or destination apparatus is a terminal on the first communication network 100 and a packet whose source or destination apparatus is the first connection apparatus 1. For example, a packet sent from a terminal on the first communication network 100 indicates a packet sent from any of a plurality of communication apparatuses 4 set up on the first communication network 100. Specifically, a packet whose source apparatus is a terminal set up on the first communication network 100 is a packet passed though both the first communication network 100 and the second communication network 200, and a packet whose source apparatus is the first connection apparatus 1 is a packet passed through only the second communication network 200. As the summarized results, there are shown the respective average values and numbers of samples for the loss rate and the respective average values, standard deviations, and numbers of samples for the increment of the delay time.

Now, the F test will be described. When the statistical values for a packet passed though both the first communication network 100 and the second communication network 200 are such that the average value is A1, the standard deviation is S1, and the number of samples is N1; and the statistical values for a packet passed through only the second communication network 200 are such that the average value is A2, the standard deviation is S2, and the number of samples is N2, the F value is calculated by the following equation (4). When the calculated F value is greater than the constant α which is determined by a significant level, i.e., F>α, the populations for distribution are determined not to be identical.

$$F=\{N1\cdot S1^2/(N1-1)\}/\{N2\cdot S2^2/(N2-1)\} \qquad (4)$$

Note that when S1<S2, the reciprocal of the calculated result, i.e., 1/F, is used as an F value.

Now, the t test will be described. The t value is calculated by the following equation (5) using the aforementioned A1, S1, and N1 and A2, S2, and N2. When the absolute value of the calculated t value is greater than the constant α which is determined by a significant level, i.e., |t|>α, the populations for the average value are determined not to be identical.

$$t=(A1-A2)/[\{(1/N1+1/N2) \cdot (N1 \cdot S1^2+N2 \cdot S2^2)\}/(N1+N2-2)]^{1/2} \quad (5)$$

At step S10 in the communication conditions determination process shown using FIG. 3, the determination results are displayed. FIG. 10 is an illustrative diagram showing contents displayed on the determination apparatus 3 used in the communication conditions determination system of the present invention. As shown in FIG. 10, the determination results of communication conditions are provided for each first communication network 100 represented by a customer ID. As the summarized results of the quality values and the results of identification of a failure point, there are shown the presence/absence, failure point, and failure correlation value of a loss failure and the presence/absence, failure point, and failure correlation value of a delay failure. For the presence/absence of a failure, "present" or "absent" is displayed. For the failure point, "carrier network (second communication network 200)" or "customer network (first communication network 100)" is displayed. For the correlation value, the t value calculated by a t test and the presence/absence of a correlation based on the t value, i.e., the test result for identity, are displayed.

By identifying and displaying a failure point as shown in FIG. 10, when the second communication network 200, for example, is identified as a failure point, measures such as switching to an auxiliary network can be taken.

Although the aforementioned embodiment shows a configuration in which the quality of communication from the ISP network to the carrier network is determined, the present invention is not limited thereto and can be developed into various configurations such as the determination of the quality of communication from the customer network to the carrier network.

In addition, although the aforementioned embodiment shows a configuration in which the summarized results of the quality values are represented by an average value and a standard deviation, the present invention is not limited thereto; the results can be summarized and compared by various methods such as a method in which the summarized results are represented by a histogram and identity is compared by performing a Mann-Whitney test on the histogram for each quality value.

As this invention may be embodied in several forms without departing from the spirit of essential characteristics thereof, the present embodiment is therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

The invention claimed is:

1. A method comprising:
monitoring packets sent in a communications system that includes a first communication network and a second communication network that are configured to communicate with each other through a connection apparatus connected between the first communication network and the second communication network;
receiving packets sent from the second communication network;
determining whether each received packet belongs to a first packet group including packets sent from the first communication network to the second communication network without passing through the connection apparatus, a second packet group including packets sent from the connection apparatus to the second communication network in a first predetermined protocol that indicates the connection apparatus as a source apparatus, or a third packet group including packets sent from the first communication network to the second communication network through the connection apparatus in a second predetermined protocol that indicates a source apparatus other than the connection apparatus, the second predetermined protocol being different from the first predetermined protocol;
separately summarizing the received packets for each of the determined packet groups;
comparing the summarized results of the received packets in the respective packet groups; and
determining which of the first communication network and the second communication network is causing a communication failure based on a result of the comparison.

2. A system comprising:
a first communication network:
a second communication network that is configured to communicate with the first communication network through a connection apparatus connected between the first communication network and the second communication network; and
a determination apparatus that determines communication conditions of the first communication network and the second communication network, the determination apparatus being configured to;
receive packets sent from the second communication network;
determine whether each received packet belongs to a first packet group including packets sent from the first communication network to the second communication network without passing through the connection apparatus, a second packet group including packets sent from the connection apparatus to the second communication network in a first predetermined protocol that indicates the connection apparatus as a source apparatus, or a third packet group including packets sent from the first communication network to the second communication network through the connection apparatus in a second predetermined protocol that indicates a source apparatus other than the connection apparatus, the second predetermined protocol being different from the first predetermined protocol;
separately summarize the received packets for each of the determined packet groups; and
compare the summarized results of the received packets in the respective packet groups and determine which of the first communication network and the second communication network is causing a communication failure based on a result of the comparison.

3. The system according to claim 2, wherein the determination apparatus determines based on a MAC (Media Access Control) address specified in the packets.

4. The system according to claim 2, wherein when the connection apparatus has an address translation function, and the determination apparatus determines based on a source IP (Internet Protocol) address specified in the packets.

5. The system according to claim 2, wherein
the determination apparatus further comprises a database in which IP addresses of the connection apparatus and an apparatus on the second communication network other than the connection apparatus are stored, and the determination apparatus determines based on a result of checking a source IP address specified in the packets against stored contents of the database.

6. The system according to claim 2, wherein the determination apparatus determines based on a protocol of the packets.

7. The system according to claim 2, wherein the determination apparatus determines based on a destination IP address specified in the packets.

8. The system according to claim 2, wherein
the determination apparatus calculates statistical values based on the summarization, and
the determination apparatus makes a determination based on a result of an identity test performed on the statistical values which are the summarized results.

9. The system according to claim 2, wherein
the determination apparatus is further configured to:
detect a packet sent to the second communication network from a third communication network which is different from both the first communication network and the second communication network; and
determine whether or not a destination apparatus of the detected packet is the connection apparatus, and
use, for the summarization, packets whose respective destination apparatuses are determined to be the connection apparatus.

10. The system according to claim 2, wherein the determination apparatus is further configured to:
determines, based on the summarized results, whether a communication quality is degraded by comparing statistical values of packet loss rate and delay time with preset threshold values;
when it is determined that there is a communication failure that causes degradation in communication quality, compare the statistical values which are the summarized results, determine the communication conditions of the first communication network and the second communication network, and identify a failure point based on the determination results.

11. The system according to claim 10, wherein failure point is determined by performing two identity tests on each statistical value and, when the tests are determined to be identical, the second communication network is identified as the failure point, when the tests are determined not to be identical, the first communication network is identified as the failure point.

12. A determination apparatus that determines communication conditions of a first communication network and a second communication network that are configured to communicate with each other through a connection apparatus connected between the first communication network and the second communication network, the determination apparatus comprising:
a detector configured to receive packets sent from the second communication network; and
a controller configured to:
determine whether each received packet belongs to a first packet group including packets sent from the first communication network to the second communication network without passing through the connection apparatus, a second packet group including packets sent from the connection apparatus to the second communication network in a first predetermined protocol that indicates the connection apparatus as a source apparatus, or a third packet group including packets sent from the first communication network to the second communication network through the connection apparatus in a second predetermined protocol that indicates a source apparatus other than the connection apparatus, the second predetermined protocol being different from the first predetermined protocol;
separately summarize the received packets for each of the determined packet groups; and
compare the summarized results of the received packets in the respective packet groups and determine which of the first communication network and the second communication network is causing a communication failure based on a result of the comparison.

13. A communication conditions determination system having a determination apparatus that determines communication conditions of a first communication network and a second communication network that are configured to communicate with each other through a connection apparatus connected between the first communication network and the second communication network, the determination apparatus comprising a controller configured for:
receiving packets sent from the second communication network;
determine whether each received packet belongs to a first packet group including packets sent from the first communication network to the second communication network without passing through the connection apparatus, a second packet group including packets sent from the connection apparatus to the second communication network in a first predetermined protocol that indicates the connection apparatus as a source apparatus, or a third packet group including packets sent from the first communication network to the second communication network through the connection apparatus in a second predetermined protocol that indicates a source apparatus other than the connection apparatus, the second predetermined protocol being different from the first predetermined protocol;
separately summarizing the received packets for each of the determined packet groups; and
comparing the summarized results of the received packets in the respective packet groups and determining which of the first communication network and the second communication network is causing a communication failure based on a result of the comparison.

14. The communication conditions determination system according to claim 13, wherein the controller makes a determination as to whether or not the received packets are packets sent to the second communication network from the connection apparatus, based on a MAC (Media Access Control) address specified in the packets.

15. The communication conditions determination system according to claim 13, wherein the controller makes a determination, when the connection apparatus has an address translation function, as to whether or not the received packets are packets sent to the second communication network from the connection apparatus, based on a source IP (Internet Protocol) address specified in the packets.

16. The communication conditions determination system according to claim 13, wherein
the determination apparatus further comprises a database in which IP addresses of the connection apparatus and an apparatus on the second communication network other than the connection apparatus are stored, and
the controller is configured to make a determination as to whether or not the received packets are packets sent to the second communication network from the connection apparatus, based on a result of checking a source IP address specified in the packets against stored contents of the database.

17. The communication conditions determination system according to claim 13, wherein the controller makes a determination as to whether the source apparatus of the received packets is the connection apparatus or an apparatus other than the connection apparatus, based on protocols of the packets.

18. The communication conditions determination system according to claim 13, wherein the controller makes a determination as to whether the source apparatus of the received packets is the connection apparatus or an apparatus other than the connection apparatus, based on a destination IP address specified in the packets.

19. The communication conditions determination system according to claim 13, wherein
the determination apparatus further comprises a database in which IP addresses of the connection apparatus and an apparatus on the second communication network other than the connection apparatus are stored, and
the controller is configured to make a determination as to whether the source apparatus of the received packets is the connection apparatus or an apparatus other than the connection apparatus, based on a result of checking a source IP address specified in the packets against stored contents of the database.

20. The communication conditions determination system according to claim 13, wherein the controller is further configured for:
calculating statistical values based on the summarization; and
making a determination based on a result of an identity test performed on the statistical values which are the summarized results.

21. The communication conditions determination system according to claim 13, wherein the controller is further configured for:
detecting a packet sent to the second communication network from a third communication network which is different from both the first communication network and the second communication network;
determining whether or not a destination apparatus of the detected packet is the connection apparatus; and
using, for the summarization, packets whose respective destination apparatuses are determined to be the connection apparatus.

\* \* \* \* \*